United States Patent
El-Saban et al.

(10) Patent No.: US 8,903,798 B2
(45) Date of Patent: Dec. 2, 2014

(54) REAL-TIME ANNOTATION AND ENRICHMENT OF CAPTURED VIDEO

(75) Inventors: Motaz Ahmed El-Saban, Cairo (EG); Xin-Jing Wang, Beijing (CN); May Abdelreheem Sayed, Cairo (EG)

(73) Assignee: Microsoft Corporation, Redmond, WA (US)

( * ) Notice: Subject to any disclaimer, the term of this patent is extended or adjusted under 35 U.S.C. 154(b) by 213 days.

(21) Appl. No.: 12/790,761

(22) Filed: May 28, 2010

(65) Prior Publication Data

US 2011/0295851 A1 Dec. 1, 2011

(51) Int. Cl.
*G06F 7/00* (2006.01)
*G06F 17/30* (2006.01)

(52) U.S. Cl.
CPC .................................. *G06F 17/3082* (2013.01)
USPC ............................. 707/708; 707/728; 707/748

(58) Field of Classification Search
USPC .................. 707/708, 728, 729, 748, 771, 913
See application file for complete search history.

(56) References Cited

U.S. PATENT DOCUMENTS

| | | | |
|---|---|---|---|
| 5,852,823 A | 12/1998 | De Bonet | |
| 5,893,095 A | 4/1999 | Jain et al. | |
| 6,005,973 A * | 12/1999 | Seybold et al. | 382/187 |
| 6,480,841 B1 | 11/2002 | Higashio et al. | |
| 6,523,026 B1 | 2/2003 | Gillis | |
| 6,523,062 B1 | 2/2003 | Bridgman et al. | |
| 6,804,684 B2 | 10/2004 | Stubler et al. | |
| 7,010,751 B2 | 3/2006 | Shneiderman | |
| 7,099,860 B1 | 8/2006 | Liu et al. | |
| 7,136,876 B1 * | 11/2006 | Adar et al. | 1/1 |
| 7,529,411 B2 * | 5/2009 | Haupt et al. | 382/220 |
| 7,624,337 B2 | 11/2009 | Sull et al. | |
| 7,739,304 B2 * | 6/2010 | Naaman et al. | 707/784 |
| 7,961,986 B1 | 6/2011 | Jing et al. | |
| 7,971,150 B2 * | 6/2011 | Raskutti et al. | 715/764 |

(Continued)

FOREIGN PATENT DOCUMENTS

| JP | 1196176 | 4/1999 |
|---|---|---|
| JP | 2003186889 | 7/2003 |

(Continued)

OTHER PUBLICATIONS

Office Action for U.S. Appl. No. 12/563,955, mailed on Oct. 13, 2011, Xin-Jing Wang, "Interest Learning from an Image Collection for Advertising", 21 pgs.

(Continued)

*Primary Examiner* — Tony Mahmoudi
*Assistant Examiner* — Merilyn Nguyen
(74) *Attorney, Agent, or Firm* — Pablo Tapia; Jim Ross; Micky Minhas

(57) ABSTRACT

An annotation suggestion platform may comprise a client and a server, where the client captures a media object and sends the captured object to the server, and the server provides a list of suggested annotations for a user to associate with the captured media object. The user may then select which of the suggested metadata is to be associated or stored with the captured media. In this way, a user may more easily associate metadata with a media object, facilitating the media object's search and retrieval. The server may also provide web page links related to the captured media object. A user interface for the annotation suggestion platform is also described herein, as are optimizations including indexing and tag propagation.

18 Claims, 9 Drawing Sheets

(56) References Cited

U.S. PATENT DOCUMENTS

| | | | |
|---|---|---|---|
| 8,023,702 | B2 | 9/2011 | Momosaki et al. |
| 8,208,764 | B2 | 6/2012 | Guckenberger |
| 8,234,277 | B2 | 7/2012 | Thong et al. |
| 8,340,498 | B1 * | 12/2012 | Gill et al. ............... 386/241 |
| 8,391,618 | B1 | 3/2013 | Chuang et al. |
| 8,442,940 | B1 | 5/2013 | Faletti et al. |
| 2002/0038299 | A1 | 3/2002 | Zernik et al. |
| 2002/0138478 | A1 | 9/2002 | Schwartz et al. |
| 2003/0018631 | A1 | 1/2003 | Lipson et al. |
| 2003/0195883 | A1 | 10/2003 | Mojsilovic et al. |
| 2004/0213553 | A1 | 10/2004 | Nagahashi |
| 2004/0225686 | A1 | 11/2004 | Li et al. |
| 2005/0114325 | A1 | 5/2005 | Liu et al. |
| 2005/0182777 | A1 | 8/2005 | Block et al. |
| 2005/0228657 | A1 | 10/2005 | Chou et al. |
| 2005/0278379 | A1 | 12/2005 | Nakazawa |
| 2006/0195321 | A1 * | 8/2006 | Deligne et al. ............... 704/257 |
| 2006/0242013 | A1 | 10/2006 | Agarwal et al. |
| 2006/0242147 | A1 | 10/2006 | Gehrking et al. |
| 2006/0264209 | A1 | 11/2006 | Atkinson et al. |
| 2007/0005571 | A1 | 1/2007 | Brewer et al. |
| 2007/0061146 | A1 | 3/2007 | Jaramillo et al. |
| 2007/0106685 | A1 * | 5/2007 | Houh et al. ............... 707/102 |
| 2007/0112844 | A1 | 5/2007 | Tribble et al. |
| 2007/0240060 | A1 | 10/2007 | Berenbach et al. |
| 2007/0266001 | A1 | 11/2007 | Williams et al. |
| 2007/0288453 | A1 | 12/2007 | Podilchuk |
| 2008/0235724 | A1 | 9/2008 | Sassenscheidt et al. |
| 2009/0012869 | A1 | 1/2009 | Henkin et al. |
| 2009/0144609 | A1 | 6/2009 | Liang et al. |
| 2009/0172030 | A1 | 7/2009 | Schiff et al. |
| 2009/0187825 | A1 | 7/2009 | Sandquist et al. |
| 2009/0196464 | A1 | 8/2009 | Dimitrova et al. |
| 2009/0196510 | A1 * | 8/2009 | Gokturk et al. ............... 382/224 |
| 2009/0208097 | A1 | 8/2009 | Husseini et al. |
| 2009/0249185 | A1 * | 10/2009 | Datar et al. ............... 715/230 |
| 2009/0300475 | A1 * | 12/2009 | Fink et al. ............... 715/230 |
| 2009/0313239 | A1 | 12/2009 | Wen et al. |
| 2009/0319883 | A1 | 12/2009 | Mei et al. |
| 2010/0057694 | A1 | 3/2010 | Kunjithapatham et al. |
| 2010/0074528 | A1 | 3/2010 | Hu et al. |
| 2010/0076923 | A1 * | 3/2010 | Hua et al. ............... 706/61 |
| 2010/0076968 | A1 * | 3/2010 | Boyns et al. ............... 707/732 |
| 2010/0145803 | A1 | 6/2010 | Kobani |
| 2010/0169178 | A1 | 7/2010 | Wang et al. |
| 2010/0177956 | A1 | 7/2010 | Cooper et al. |
| 2010/0205202 | A1 | 8/2010 | Yang et al. |
| 2010/0260426 | A1 | 10/2010 | Huang et al. |
| 2010/0293174 | A1 | 11/2010 | Bennett et al. |
| 2010/0325015 | A1 | 12/2010 | Westphal |
| 2011/0038512 | A1 | 2/2011 | Petrou et al. |
| 2011/0085739 | A1 | 4/2011 | Zhang et al. |
| 2011/0116690 | A1 | 5/2011 | Ross et al. |
| 2011/0123115 | A1 | 5/2011 | Lee et al. |
| 2011/0173141 | A1 * | 7/2011 | Campbell et al. ............... 706/12 |
| 2013/0282712 | A1 | 10/2013 | Brandt |
| 2014/0032529 | A1 | 1/2014 | Chang |

FOREIGN PATENT DOCUMENTS

| | | |
|---|---|---|
| JP | 2004234228 | 8/2004 |
| JP | 2005011079 | 1/2005 |
| JP | 2005352782 | 12/2005 |
| KR | 20040054901 | 6/2004 |
| RU | 2193797 | 11/2002 |

OTHER PUBLICATIONS bing.com, Maps, Retrieved on Dec. 28, 2009 at <<http://cn.bing.com/ditu/>>, 2 pages.

Cai, et al., "Hierarchical Clustering of WWW Image Search Results Using Visual, Textual and Link Information", retrieved on May 26, 2010 at <<http://citeseerx.ist.psu.edu/viewdoc/download?doi=10.1.1.72.455&rep=rep1&type=pdf>>, ACM, Proceedings of International Conference on Multimedia (MM), New York, NY, Oct. 2004, pp. 952-959.

Chang et al., "LIBSVM: a Library for Support Vector Machines", retrieved on Apr. 12, 2010 at <<http:// http://www.csie.ntu.edu.tw/~cjlin/papers/libsvm.pdf>>, National Taiwan University Technical Report, Computer Science and Information Engineering, 2001-2004, pp. 1-30.(software available at http://www.csie.ntu.edu.tw/~cjlin/libsvm).

Classification and Retrieval of Images—Published Date: Sep. 17, 2010 http://claret.wikidot.com/ 3 pages.

Fergus et al., "A Visual Category Filter for Google Images," Computer Vision—\ ECCV, 2004, Lecture Notes in Computer Science, 2004, vol. 3021/2004, 14 pages.

Flickr. retrieved on Feb. 4, 2010 at <<http://www.flickr.com >>, 1 page.

"Google Sets", retrieved on Dec. 15, 2008 at <<http://labs.google.com/sets>>, Google, 1 page.

Google, retrieved on Feb. 16, 2011 at <<www.google.com>>, 1 page.

Hua, et al. "Internet Multimedia Search and Mining"—Published date: Jan. 27, 2010 http://research.microsoft.com/en-us/um/people/xshua/imsm/ebook/pdf/16.pdf, 30 pages.

Jing, et al., "VisualRank: Applying PageRank to Large-Scale Image Search", retrieved on May 26, 2010 at <<http://www.cc.gatech.edu/home/yjing/pami_camera_ready.pdf>>, IEEE Computer Society, Transactions on Pattern Analysis and Machine Intelligence, vol. 30, No. 11, Nov. 2008, pp. 1-14.

Kennedy, et al., "Generating Diverse and Representative Image Search Results for Landmarks", retrieved on May 26, 2010 at <<http://www.google.co.in/url?sa=t&source=web&ct=res&cd=6&ved=0CB8QFjAF&url=http%3A%2F%2Fciteseerx.ist.psu.edu%2Fviewdoc%2Fdownload%3Fdoi%3D10.1.1.119.1522%26rep%3Drep1%26type%3Dpdf&rct=j&q=generating+web+image +cluster&ei=A0irS6LUMtO6jAeJofjWDw&usg=AFQjCNEFwCBRBWDdZlkpXuFUcIS1-n601g>>, ACM, Proceedings of the 17th international conference on World Wide Web.

Li et al., "Automatic Linguistic Indexing of Pictures by a Statistical Modeling Approach" IEEE Transactions on Pattern Analysis and Machine Intelligence, 25(9):1075-1088, 2003.

Lowe, "Distinctive Image Features from Scale-Invariant Keypoints", retrieved on Jul. 30, 2010 at <<http://citeseerx.ist.psu.edu/viewdoc/download?doi=10.1.1.157.3843&rep=rep1&type=pdf>>, Kluwer Academic Publishers, Hingham, MA, vol. 60, No. 2, International Journal of Computer Vision, 2004, pp. 91-110.

Miller, "Wordnet: an on-line lexical database" International Journal of Lexicography, pp. 39-41, 1990.

Needle Seek, retrieved on Feb. 16, 2011 at <<http://needleseek.msra.cn>>, 1 page.

Noah, et al. "Binding Semantic to a Sketch Based Query Specification Tool"—Published Date: Apr. 2009 http://www.ccis2k.org/iajit/PDF/vol. 6,No. 2/2BSSBQST116.pdf, 8 pages.

Nowak, et al., "Sampling strategies for bag-of-features image classification," (c) Springer-Verlag Berlin Heidelberg 2006, ECCV 2006, retrieved at <<http://lear.inrialpes.fr/people/nowak/dwl/eccv06.pdf>>, 14 pages.

Picasa 3, retrived at http://picasa.google.com/ on Aug. 4, 2009, 1 page.

The Russian Office Action mailed Mar. 25, 2011 for Russian Patent Application No. 2008145584, a counterpart foreign application of U.S. Appl. No. 11/419,368.

Strong, et al., "Organizing and Browsing Image Search Results based on Conceptual and Visual Similarities" Retrieved Date: Jan. 5, 2011 http://www.cs.mun.ca/~hoeber/download/2010_isvc_vibe_concept.pdf, 10 pages.

Wnuk, et al. "Filtering Internet Image Search Results Towards Keyword Based Category Recognition" Retrieved Date: Jan. 5, 2011 http://vision.ucla.edu/papers/wnukS08.pdf, 8 pages.

Yang, et al., "A Comparative Study on Feature Selection in Text Categorization", Proceedings of the Fourteenth International Conference on Machine Learning, 1997, pp. 412-420 (9 pgs.).

Barnard, et al., "Matching Words and Pictures", retrieved on Apr. 16, 2010 at <<http://www.cs.princeton.edu/~blei/papers/Barnard-

(56) References Cited

OTHER PUBLICATIONS

DuyguluFreitasForsythBleiJordan2003.pdf>>, JMLR.org, Journal of Machine Learning Research, vol. 3, Mar. 2003, pp. 1107-1135.

Carneiro, et al., "Supervised Learning of Semantic Classes for Image Annotation and Retrieval", retrieved on Apr. 16, 2010 at <<http://citeseerx.ist.psu.edu/viewdoc/download?doi=10.1.1.88.3490&rep=rep1&type=pdf>>, IEEE Computer Society, Transactions on Pattern Analysis and Machine Intelligence, vol. 29, No. 3, Mar. 2007, pp. 394-410.

Deng, et al., "ImageNet: A Large-Scale Hierarchical Image Database", retrieved on Apr. 16, 2010 at <<http://wordnet.cs.princeton.edu/papers/imagenet_cvpr09.pdf>>, Proceedings of the IEEE Conference on Computer Vision and Pattern Recognition (CVPR), 2009, pp. 1-8.

Fellbaum (ed.), "WordNet: An Electronic Lexical Database", retrieved on Apr. 16, 2010 at <<http://www.dsoergel.com/cv/C19.pdf>>, MIT Press, Cambridge, MA, May 1998, 7 pages.

Foo, et al., "Detection of Near-duplicate Images for Web Search", retrieved on Apr. 16, 2010 at <<http://www.cs.rmit.edu.au/~jufoo/pdfs/CIVR07_Foo.pdf>>, ACM, Proceedings of the 6th International Conference on Image and Video Retrieval (CIVR), Amsterdam, The Netherlands, Feb. 2007, pp. 557-564.

Gelasca, et al., "Cortina: Searching a 10 Million + Images Database", retrieved on Apr. 16, 2010 at <<http://vision.ece.ucsb.edu/publications/elisa_VLDB_2007.pdf>>, VLDB Endowment, Proceedings of Conference on Very Large Data Bases (VLDB), Vienna, Austria, vol. 7, Sep. 2007, pp. 2-5.

Griffin, et al., "Caltech-256 Object Category Dataset", retrieved on Apr. 16, 2010 at <<http://authors.library.caltech.edu/7694/1/CNS-TR-2007-001.pdf>>, Caltech Technical Report 7694, 2007, pp. 1-20.

Hays, et al., "Scene Completion Using Millions of Photographs", retrieved on Apr. 16, 2010 at <<http://delivery.acm.org/10.1145/1280000/1276382/a4-hays.pdf?key1=1276382&key2=4013141721&coll=GUIDE&dl=GUIDE&CFID=84511483&CFTOKEN=74352152>>, ACM, Transactions on Graphics, vol. 26, No. 3, Article 4, Jul. 2007, pp. 1-8.

Jaspers et al., "Candela—Storage, Analysis and Retrieval of Video Content in Distributed Systems", retrived at <<http://vca.ele.tue.nl/publications/data/jaspers2005a.pdf>>, on Apr. 17, 2010, 14 pages.

Ke, et al., "PCA-SIFT: A More Distinctive Representation for Local Image Descriptors", retrieved on Apr. 16, 2010 at <<http://www.cs.cmu.edu/~rahuls/pub/cvpr2004-keypoint-rahuls.pdf>>, IEEE Computer Society, Conference on Computer Vision and Pattern Recognition (CVPR), vol. 2, Jun. 2004, pp. 1-8.

Li, et al., "Image Annotation by Large-Scale Content-based Image Retrieval", retrieved on Apr. 16, 2010 at <<http://doi.acm.org/10.1145/1180639.1180764>>, ACM, Proceedings of the 14th Annual International Conference on Multimedia, Santa Barbara, CA, Oct. 2006, pp. 607-610.

Li, et al., "Searching One Billion Web Images by Content: Challenges and Opportunities", retrieved on Apr. 16, 2010 at <<http://research.microsoft.com/en-us/um/people/leizhang/paper/mcam07-li.pdf>>, Springer-Verlag Berlin, Proceedings of International Workshop on Multimedia Content Analysis and Mining (MCAM), Weihai, China, Jul. 2007, pp. 33-36.

Lin et al., "Video Collaborative Annotation Forum: Establishing Ground-Truth Labels on Large Multimedia Datasets", IBM T.J. Watson research Center, 2003, pp. 1-19.

Moxley, et al., "Automatic Video Annotation through Search and Mining", retrieved on Apr. 16, 2010 at <<http://ieeexplore.ieee.org/stamp/stamp.jsp?tp=&arnumber=4607527>>, IEEE Conference on Multimedia and Expo (ICME), Hannover, Germany, Jun. 2008, pp. 685-688.

"ODP—The Open Directory Project", retrieved on Apr. 16, 2010 at <<http://dmoz.org/>>, 2010, pp. 1.

Torralba, et al., "80 million tiny images: a large dataset for non-parametric object and scene recognition", retrieved on Apr. 16, 2010 at <<http://people.csail.mit.edu/torralba/publications/80millionImages.pdf>>, IEEE Computer Society, Transactions on Pattern Analysis and Machine Intelligence, vol. 30, No. 11, Nov. 2008, pp. 1958-1970.

Tseng et al., "Video Summarization and Personalization for Pervasive Mobile Devices", IBM T.J. Watson Research Center, 2002, pp. 1-12.

VTT," MobiCon—Integrated Capture, Annotation and Sharing of Video Clips with Mobile Phones", retrvied at <<http://www.vtt.fi/files/services/ipr/mobicon_integrated_capture.pdf >>on Apr. 17, 2010, 2 pages.

Wang, et al., "Advertising Based on Users' Photos", retrieved on Apr. 16, 2010 at <<http://ieeexplore.ieee.org/stamp/stamp.jsp?tp=&arnumber=5202834>>, IEEE International Conference on Multimedia and Expo (ICME), New York, NY, 2009, pp. 1640-1643.

Wang, et al., "AnnoSearch: Image Auto-Annotation by Search", retrieved on Apr. 16, 2010 at <<http://research.microsoft.com/en-us/um/people/leizhang/paper/cvpr06_annosearch.pdf>> IEEE Computer Society, Proceedings of Conference on Computer Vision and Pattern Recognition (CVPR), vol. 2, 2006, pp. 1483-1490.

Wang, et al., "Content-Based Image Annotation Refinement", retrieved on Apr. 16, 2010 at <<http://research.microsoft.com/en-us/um/people/leizhang/paper/cvpr07-changhu.pdf>>, IEEE Conference on Computer Vision and Pattern Recognition (CVPR), Jun. 2007, pp. 1-8.

Wang, et al., "Large-Scale Duplicate Detection for Web Image Search", retrieved on Apr. 16, 2010 at <<http://www.cecs.uci.edu/~papers/icme06/pdfs/0000353.pdf>>, IEEE Conference on Multimedia and Expo (ICME), Toronto, Canada, Jul. 2006, pp. 353-356.

Yamamoto et al., "iVAS: Web-based Video Annotation System and its Applications", retrived at <<http://iswc2004.semanticweb.org/demos/29/paper.pdf>>on Apr. 17, 2010, pp. 1-4.

Yeh, et al., "Searching the Web with Mobile Images for Location Recognition", retrieved on Apr. 16, 2010 at <<http://groups.csail.mit.edu/vision/vip/papers/yeh_cvpr04.pdf>>, IEEE Computer Society, Conference on Computer Vision and Pattern Recognition (CVPR), vol. 2, Jul. 2004, pp. 1-6.

Zeng, et al., "Learning to Cluster Web Search Results", retrieved on Apr. 16, 2010 at <<http://net.pku.edu.cn/~wbia/2004/public_html/papers/learning-to-cluster-web.pdf>>, ACM, Proceedings of the 27th International SIGIR Conference on Research and Development in Information Retrieval, 2004, Sheffield, UK, Jul. 2004, pp. 210-217.

Zhang, et al., "EnjoyPhoto—A Vertical Image Search Engine for Enjoying High-Quality Photos", retrieved on Apr. 16, 2010 at <<http://research.microsoft.com/en-us/um/people/leizhang/paper/acmmm06-enjoyphoto.pdf>>, ACM, Proceedings of the 14th Annual International Conference on Multimedia (MM), Santa Barbara, California, Oct. 2006, pp. 367-376.

Cheng et al., "Auto-Generation of Topic Hierarchies for Web Images from Users' Perspectives", Proc 12th Intl Conf on Information and Knowledge Management, Nov. 2003, available at http://portal.acm.org/citation.cfm?id=956969, 4 pgs.

Translated Chinese Office Action mailed Jul. 6, 2011 for Chinese patent application No. 200780017842.6, a counterpart foreign application of U.S. Appl. No. 11/419,368.

Office Action for U.S. Appl. No. 11/419,368, mailed on Aug. 5, 2011, Lei Zhang, "Annotation by Search".

Batra, et al., "Cutout-Search: Putting a Name to the Picture", retrieved on Aug. 2, 2010 at <<http://chenlab.ece.cornell.edu/people/adarsh/publications/cvpr_iv_2009.pdf>>, IEEE Computer Society, Proceedings of Workshop on Computer Vision and Pattern Recognition (CVPR), Miami, Florida, Jun. 2009, pp. 23-30.

"Become an Online Image Detective with TinEye (groovyReview)", retrieved on Aug. 3, 2010 at <<http://www.groovypost.com/howto/groovyreview/become-online-image-detective-tineye-review/>>, groovyPost.com, Jan. 18, 2010, pp. 1-11.

Deschacht, et al., "Text Analysis for Automatic Image Annotation", retrieved on Aug. 2, 2010 at <<http://class.inrialpes.fr/pub/106-deschacht-acl07.pdf>>, Meeting of the Association for Computational Linguistics, Prague, Jun. 2007, pp. 1-8.

Jones, "Windows Live Photo and Video Blog", retrieved on Aug. 3, 2010 at <<http://blogs.msdn.com/b/pix/archive/2008/09/17/next-version-of-windows-live.aspx>>, Sep. 17, 2008, pp. 1.

(56) References Cited

OTHER PUBLICATIONS

Monaghan, et al., "Automating Photo Annotation using Services and Ontologies", retrieved on Aug. 2, 2010 at <<http://ieeexplore.ieee.org/stamp/stamp.jsp?arnumber=01630615>>, IEEE Computer Society, Proceedings of International Conference on Mobile Data Management (MDM), 2006, pp. 1-4.

Osman, et al., "Semantic Annotation and Retrieval of Image Collections", retrieved on Aug. 2, 2010 at <<http://www.scs-europe.net/conf/ecms2007/ecms2007-cd/ecms2007/ecms2007%20pdf/vv_0167.pdf>>, Proceedings European Conference on Modelling and Simulation (ECMS), 2007, pp. 1-6.

Satoh, et al., "Name-It: Naming and Detecting Faces in News Videos", retrieved on Aug. 2, 2010 at <<http://www.informedia.cs.cmu.edu/documents/nameit_IEEE-MM99.pdf>>, IEEE Computer Society, Multimedia, vol. 6, No. 1, 1999, pp. 22-35.

Trajkova, et al., "Improving Ontology-Based User Profiles." In Proc. of RIAO, pp. 380-389, 2004.

Wang, et al., "Arista—Image Search to Annotation on Billions of Web Photos", retrieved on Aug. 2, 2010 at <<http://research.microsoft.com/en-us/people/xjwang/cvpr10_paper301_arista_final.pdf>>, IEEE Computer Society, Proceedings of Conference on Computer Vision and Pattern Recognition (CVPR), San Francisco, California, Jun. 2010, pp. 1-8.

The Chinese Office Action mailed Oct. 17, 2012 for Chinese patent application No. 200780017842.6, a counterpart foreign application of U.S. Appl. No. 11/419,368, 8 pages.

Office action for U.S. Appl. No. 13/110,282, mailed on Nov. 9, 2012, Wang et al., "Text to Image Translation", 20 pages.

U.S. Appl. No. 13/110,282; "Text to Image Translation" Wang, et al., filed May 18, 2011.

The Chinese Office Action mailed Mar. 20, 2012 for Chinese patent application No. 200780017842.6, a counterpart foreign application of U.S. Appl. No. 11/419,368, 8 pages.

Translated Japanese Office Action mailed May 25, 2012 for Japanese patent application No. 2009-511113, a counterpart foreign application of U.S. Appl. No. 11/419,368, 8 pages.

Office Action for U.S. Appl. No. 12/563,955, mailed on Mar. 15, 2012, Xin-Jing Wang, "Interest Learning from an Image Collection for Advertising", 23 pgs.

Office action for U.S. Appl. No. 12/790,772, mailed on May 24, 2012, Wang et al., "Associating Media With Metadata of Near-Duplicates", 12 pages.

The Chinese Office Action mailed Feb. 5, 2013 for Chinese patent application No. 200780017842.6, a counterpart foreign application of U.S. Appl. No. 11/419,368, 7 pages.

Office action for U.S. Appl. No. 12/942,284, mailed on Jan. 2, 2013, Zhang et al., "Building a Person Profile Database", 11 pages.

Office action for U.S. Appl. No. 12/563,955, mailed on May 6, 2013, Wang et al., "Interest Learning from an Image Collection for Advertising", 25 pages.

Office action for U.S. Appl. No. 12/790,772, mailed on Sep. 26, 2013, Wang, et al., "Associating Media With Metadata of Near-Duplicates", 20 pages.

Translated Korean Office Action mailed Jun. 14, 2013 for Korean patent application No. 10-2008-7028292, a counterpart foreign application of US patent No. 8,341,112, 7 pages.

Office action for U.S. Appl. No. 13/110,282, mailed on Jul. 30, 2013, Xin-Jing Wang et al, "Text to Image Translation", 18 pages.

Office action for U.S. Appl. No. 12/790,772, mailed on Jun. 3, 2013, Wang et al., "Associating Media With Metadata of Near-Duplicates", 15 pages.

Office action for U.S. Appl. No. 12/563,955, mailed on Aug. 23, 2013, Wang et al., "Interest Learning from an Image Collection for Advertising", 25 pages.

Office action for U.S. Appl. No. 13/110,282, mailed on Feb. 20, 2014, Wang, et al., "Text to Image Translation", 27 pages.

Office action for U.S. Appl. No. 12/563,955, mailed on Dec. 17, 2013, Wang, et al., "Interest Learning from an Image Collection for Advertising", 25 pages.

Final Office Action for U.S. Appl. No. 13/110,282, mailed on May 23, 2014, Wang, et al., "Text to Image Translation", 27 pages.

\* cited by examiner

REAL-TIME ANNOTATION AND ENRICHMENT OF CAPTURED VIDEO

BACKGROUND

The present ubiquity of digital cameras, mobile phone cameras, portable video recorders, as well as other devices with integrated cameras has resulted in a large and ever growing body of media objects. In order to manage the sheer volume of still images, videos, audio, and other forms of media, efforts to manage media have come in the form of organizing media objects in location based organizations schemes such as folders. In this way, media objects can be located quickly, and consumed after capture.

However, when media objects are shared between users, locations of the media objects change. With large amounts of media objects being stored on personal and public data stores, local and on the Internet, there have been efforts to implement generalized searching of media objects. However, current non-textual search techniques lag in accuracy and performance behind text-based search techniques. Accordingly, media objects have been associated with text, in the form of metatags, embedded tags, and overloaded file names so that text searching on the associated text can allow textual search techniques to be applied to non-textual data.

Associating text with media objects is cumbersome. Most mobile devices do not have user interfaces with which a user may easily enter text. Even when a media capture device is a mobile device with a text friendly input device, such as a netbook with a keyboard, users are more prone to consume the media object at time of capture and defer associating metadata until later. The end result is that text is rarely associated with the captured media object afterwards, and accordingly the media object is rarely consumed again.

SUMMARY

This disclosure describes techniques for associating text with a digital media object at time of capture. At time of capture, a user may receive from server suggestions of text to associate with a media object. The user may select text from the suggestions for association with the media object. The selected text can be converted into an Internet query to retrieve web pages relevant to the captured media.

This disclosure also describes a user interface for a user to view, select, and associate suggested metadata. The user interface provides forms for a user to enter user preferences including, but not limited to choice of natural language of the suggested text. The user interface further provides a space for web pages to be navigated and viewed.

This disclosure also describes optimizations. In particular, tag propagation within a video object is described. Specifically, where a selected frame has preceding frames, this disclosure describes techniques to determine which tags associated with the preceding frames should be also be associated with the selected frame. In other words, associating metadata with of video frames can be automated, since associating metadata of successive frames depends on what metadata is associated with preceding frames in a video object. Note that metadata from preceding frames is but one possible resource for a succeeding frame. Tag propagation is may be used alone, or in combination with other techniques to provide annotation to frames. Most notably, tag propagation may be used with online selection of annotations as suggested by a server.

This summary is provided to introduce concepts relating to community model based point of interest local search. These techniques are further described below in the detailed description. This summary is not intended to identify essential features of the claimed subject matter, nor is it intended for use in determining the scope of the claimed subject matter.

BRIEF DESCRIPTION OF THE DRAWINGS

Non-limiting and non-exhaustive examples are described with reference to the following figures. In the figures, the left-most digit(s) of a reference number identifies the FIG. in which the reference number first appears. The use of the same reference numbers in different figures indicates similar or identical items or features.

DETAILED DESCRIPTION

Overview

This application relates to annotating media objects at or near the time of capture. This application further relates to a client capturing a media object, such as a video or still image, receiving suggested annotations from a server with which to associate with the media object, and receiving links to web pages that may relate to the captured media. This application also includes optimizations to an annotation suggestion platform including, but not limited to indexing and tag propagation.

Media objects include, but are not limited to, digital still images, digital video files, digital audio files, and text. Media objects that combine different types of media into a single file are also referred to as multimedia objects. For example, a multimedia object for a movie may include a video stream, an audio soundtrack, and commentary in the form of text. For purposes of this application, multimedia objects will also be referred to as media objects.

Annotation is the association of a digital media object with text data. Associating text data with digital objects allows text search techniques to be leveraged on otherwise non-textual digital objects. Textual data may be associated by various techniques such as overloading file names, adding meta-tags, and associating links to data stores containing meta-tags. Accordingly, a search engine may find digital media objects by searching their metadata, alone or in combination with other search techniques.

In some contexts, annotation is distinguished from commentary. Both annotation and commentary refer to associating text data with a media file. However, annotation can also mean association text with a particular frame of a video, or a particular time in an audio track, whereas commentary is text associated with the entire media object. In some cases, annotation can refer to associating text not only with a particular frame, but with a particular location in a frame or a particular object depicted in a frame.

For purposes of this application, annotation refers to both annotation and commentary, regardless of rendering.

A suggested annotation for a digital media object is any textual data that an automated process provides to a requester as relevant to the digital media object based on a predefined determination of relevancy. For example, features of a captured media object may be extracted, digital objects similar to the captured object may be extracted from a database based on those features, and the metadata of the similar digital objects provided as annotation suggestions to the captured media object. By way of another example, a digital media object may be subjected to object recognition, and a lookup table mapping recognized objects to names may generate candidate metadata to be provided as annotation suggestions. The candidate metadata may be subjected to an ontology, a synonym dictionary or a foreign language dictionary to obtain additional annotation suggestions.

Example Annotation Suggestion Platform

Figure 1:
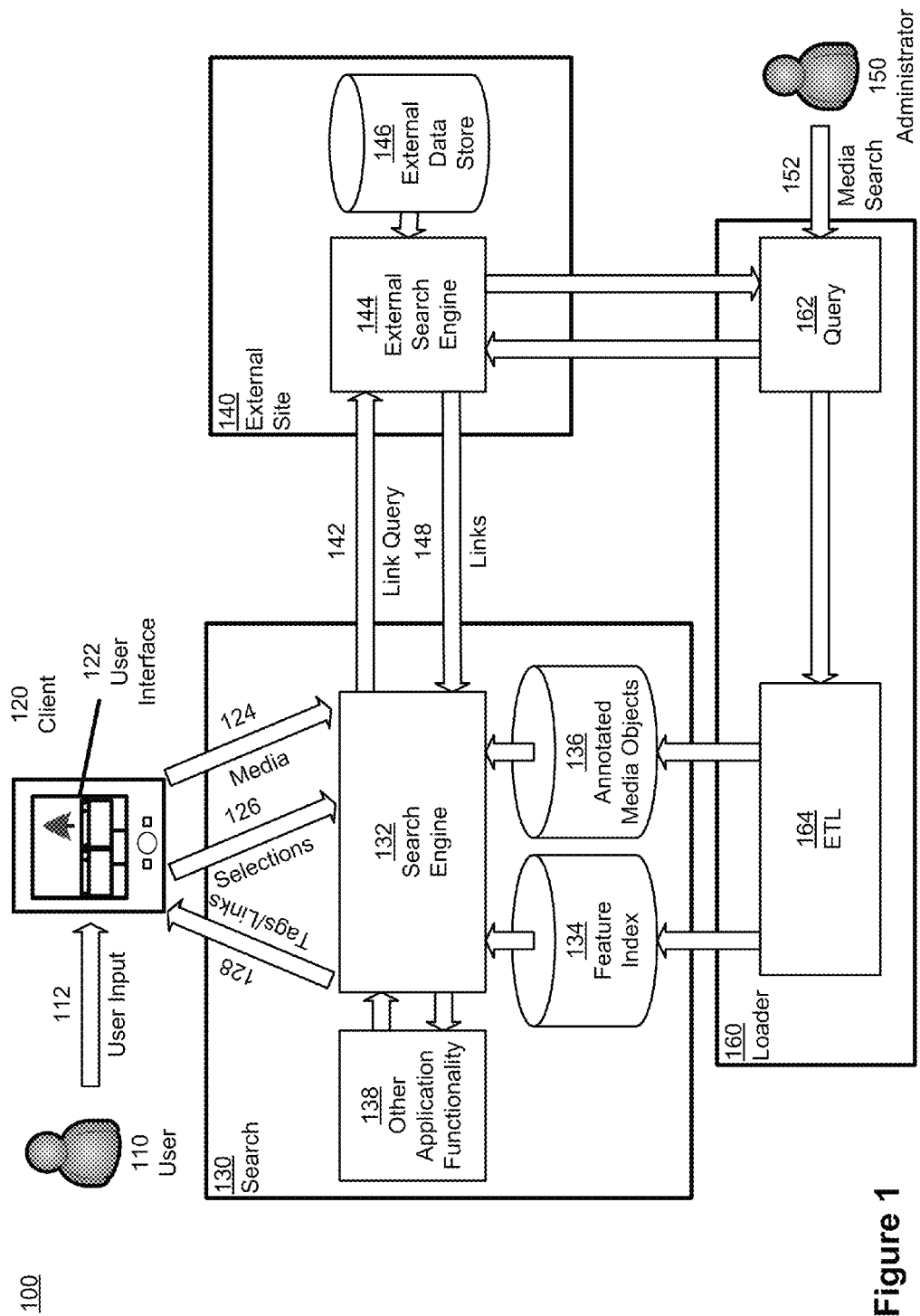
FIG. 1 is a top-level system diagram of an example annotation suggestion platform.

FIG. 1 illustrates an example annotation suggestion platform 100. A user 110 uses a client 120 capture a media object, such as a video. The user 110 may consume the video on user interface 122.

The user may enter user input 112 into user interface 122 to interact with client 120. Interactions include, but are not limited to, entering user preferences, selections of annotation suggestions, link navigation and selection and web page navigation. In cases such as entering user preferences, client 120 will forward user input 112 to the application modules 138. These application modules 138 may then use user input 112 to modify operations by search engine 132 or other functionality implemented by other application module 138.

The user may also enter user input 112 into user interface 122 causing client 120 to send a request for suggested tags 124 to search facility 130. The request 124 may comprise the media object itself or a reference to the media object.

The search facility 130 comprises a search engine 132 and a number of data stores including, but not limited to a feature index 134 and a data store of media objects and their associated annotations 136. The search facility is implemented in the context of an application comprising other application modules 138. Feature index 134 uses features or feature identifiers as a key to locate an associated media object. Specifically, given a feature, the feature index 134 can identify media objects with that feature in media object data store 136. Because the media object data store stores the media objects associated annotations, data store 136 can also provide candidate annotations. Search engine 132 may invoke other application functionality 138 to determine which candidate annotations should be suggested as annotations 128 to the client 120.

Search engine 132 in general may invoke other application functionality 138 to modify search queries and other search engine operations. For example, if a user has specified user preferences such as natural language choice, or filtering out adult content with user input 112, then client 120 forwards these preferences to application functionality 138 for persistence and later retrieval. Thus, if a user were to specify Russian as a language of choice for tags, search engine 132 would retrieve this preference from application functionality 138, generate link query 142 with the Russian language criterion, and execute the link query 142 accordingly.

Upon receiving annotations 128, user 110 may use user interface 122 to select metadata to associate with the captured media object.

Upon selection, client 120 may perform the association to the locally stored captured media object. Client 120 may also forward selections 126 to search engine to be used to search for web page links relevant to the captured media from a web site 140, for example an external search engine 144. Specifically, search engine 132 uses user annotation selections 126 to generate a query for web page links 142. Alternatively, if the generated suggestions 128 are of high confidence, search engine 132 may generate link query 142 without making use of user selections 126.

The generated link query 142 may simply be a concatenation of the selected annotations 126 as key words. Alternatively, additional key words identified by seeking terms related to the selected annotation via ontologies, synonym dictionaries and foreign dictionaries may be brought to bear. These ontologies, synonym dictionaries and foreign dictionaries may be stored in data stores and accessed via other application functionality 138. Alternatively, ontologies, synonym dictionaries and foreign dictionaries may be stored as part of the other application functionality 138.

External search engine 144 the queries external data store 146 for web page links that satisfy link query 142. External data store 146 may contain content itself, or references to outside web pages collected by a web crawler or bot. Upon execution of the link query 142, external search engine 144 forwards web page links 148 back to search engine 132 which in turn forwards the link results 128 back to client 120 for display in user interface 122.

An alternative link search would be for client 120 to directly query the external site 140. In this case, the generation of a link query is performed in a software module on client 120, and the link results 148 are returned directly to client 120 for display in user interface 122. In this configuration, where user input 112 specifies user preferences, those user preferences will be stored locally to the client. In this way, a generated link query may take these preferences into account as described above.

In either alternative, a user 110 may then navigate and select web page links in user interface 122. Upon selection, the client will go to the selected link and display the corresponding web page on user interface 122.

Annotation suggestion relies on have annotations to suggest being stored in data stores 134 and 136. Data stores 134 and 136 are initially populated and updated by an administrator 150 that executes a media search 152, and invokes a loader 160 to load data stored 134 and 136. Specifically, administrator 150 specifies media to be searched, and loader 160 generates a query 162 from the media search 152. The query 162 is executed against an external search engine 144 which in turn returns media objects or references to media objects that satisfy the query 162. These objects are then sent to an extract, transform and load (ETL) module 164. ETL module 164 then extracts the media objects from the query results, and extracts features in the media objects. ETL module 164 then stores media objects in data store 136 and stores unique features or references to unique features in feature index 134 along with a reference to the media objects with those features. In this way, search engine 132 may identify media objects having a particular feature, by using the feature as a key against feature index 134.

ETL module 164 may also extract annotations associated with media objects returned by the results of query 162. The annotation text may simply be any text that came with the digital object in the query including, but not limited to, surrounding text from a hosting web page, metadata, embedded tags, and terms from the filename, title of web page, user comments in page, optical character recognition of text in a multimedia object, or generated from machine learning or data mining techniques. The annotation text may be stored as is, or may be parsed and processed to refine the annotations. The annotations may be stored with the media objects in data store 136, or alternatively in a separate data store.

In this way, once a media object is identified as relevant to a captured media object, search engine 132 may then retrieve annotations associated with the relevant media object. These retrieved annotations may then be refined into annotation suggestions 128 for the captured media object.

Exemplary Hardware Environment

Figure 2:
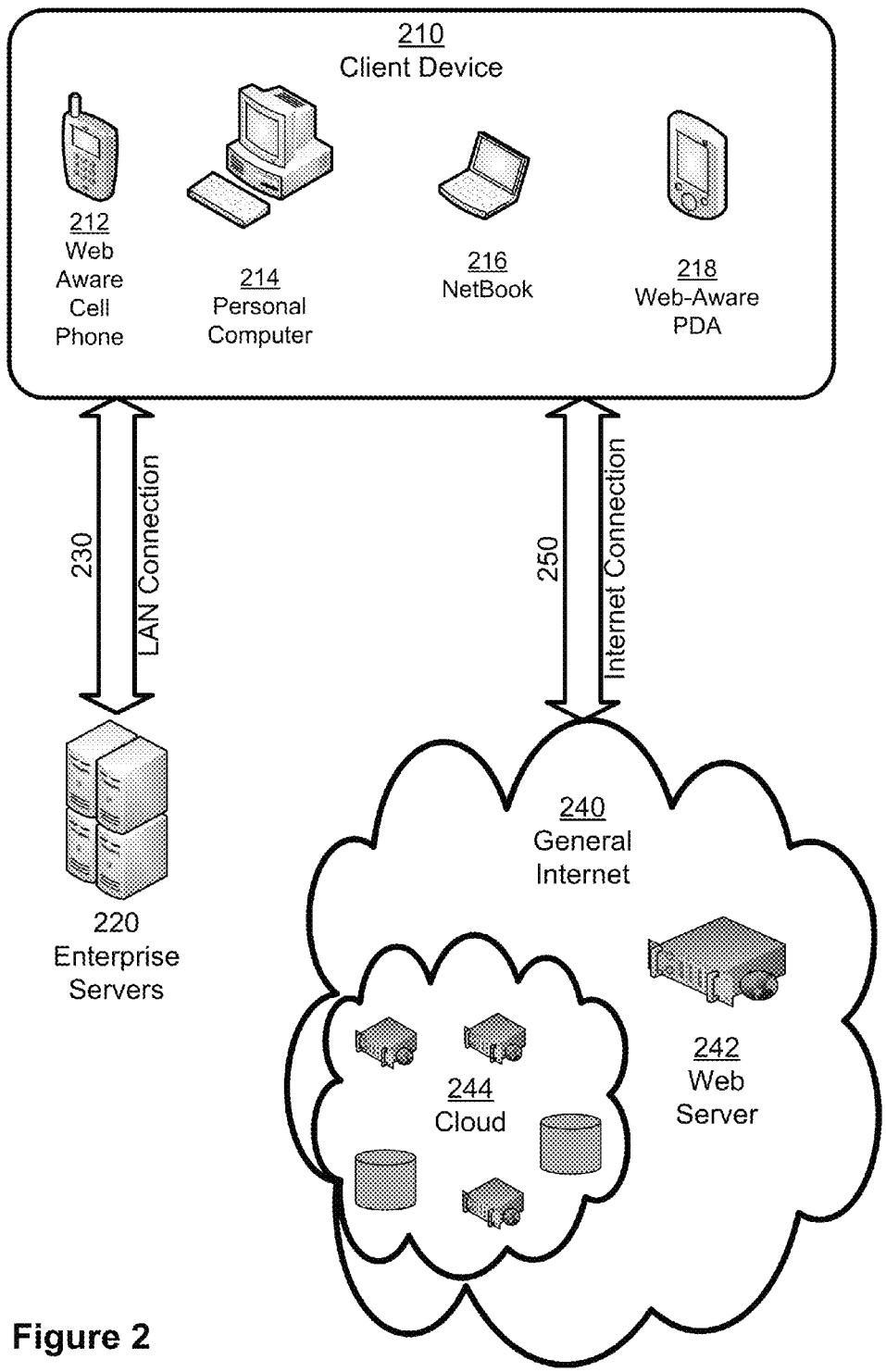
FIG. 2 is an example hardware environment supporting an annotation suggestion platform.

FIG. 2 illustrates an exemplary hardware environment 200 for annotation suggestion. Specifically, FIG. 2 illustrates an exemplary hardware environment 200 to host an annotation suggestion platform.

An application based on an annotation suggestion platform is capable of being hosted on a wide range of client devices 210. If an application based on an annotation suggestion platform is embodied in a web page, the client device may be any web-aware client, including but not limited to a cell phone 212, personal computer ("PC") 214, netbook 216, or web aware personal device assistant ("PDA") 218. If the application based on an annotation suggestion platform is embodied in a windowed application, it may be hosted on a PC 214 or netbook 216. PC 214 may include any device of the standard PC architecture, or may include alternative personal computers such as the MacIntosh™ from Apple Computer™, or workstations including but not limited to UNIX workstations.

An application based on an annotation suggestion platform on a client device 210 may then access a search engine or application server hosted on an enterprise server 220 or a server hosted on the general internet 230.

If an application based on an annotation suggestion platform is accessing an enterprise server 220 on a local area network ("LAN"), it may connect via any number of LAN connectivity configurations 230. At the physical layer this may include Ethernet™ or Wi-Fi™. At the network/session/transport layer this may include connectivity via the Transmission Control Protocol/Internet Protocol ("TCP/IP") or other protocol. If the color layout UI is accessing the internet, it may connect via standard internet protocols including TCP/IP for the network/session/transport layer and Hypertext Transfer Protocol ("HTTP") at the application layer.

Enterprise server 220 may be based on a standard PC architecture, or on a mainframe.

If accessing the general internet 230, an independently hosted web server 242 may be accessed. A web server 242 may be a standard enterprise server based on a standard PC architecture that hosts an application server. Exemplary application server software includes Internet Information Server™ ("IIS") from Microsoft Corporation™ or Apache Web Server, an open source application server. Web server 242 may access a database server also potentially on a standard PC architecture hosting a database. Exemplary databases include, Microsoft SQL Server™ and Oracle™. In this way a platform supporting community model based point of interest local search may be either 2-tier or 3-tier.

Alternatively, an application based on an annotation suggestion platform or the annotation suggestion platform itself may be hosted on a cloud computing service 244. Cloud computing service 244 contains a large number of servers and other computing assets potentially in geographically disparate locations. These computing assets may be disaggregated into their constituent CPUs, memory, long term storage, and other component computing assets. Accordingly, the metadata association process, the search engine, and a digital media object datastore, when hosted on cloud computing service 244, would have both centralized and distributed data storage on the cloud, accessible via a data access API such as Open Database Connectivity ("ODBC") or ADO.Net™ from Microsoft Corporation™. An application based on an annotation suggestion platform would be hosted on computing assets in the cloud computing service 244 corresponding to an application server.

Exemplary Mobile Client

Figure 3:
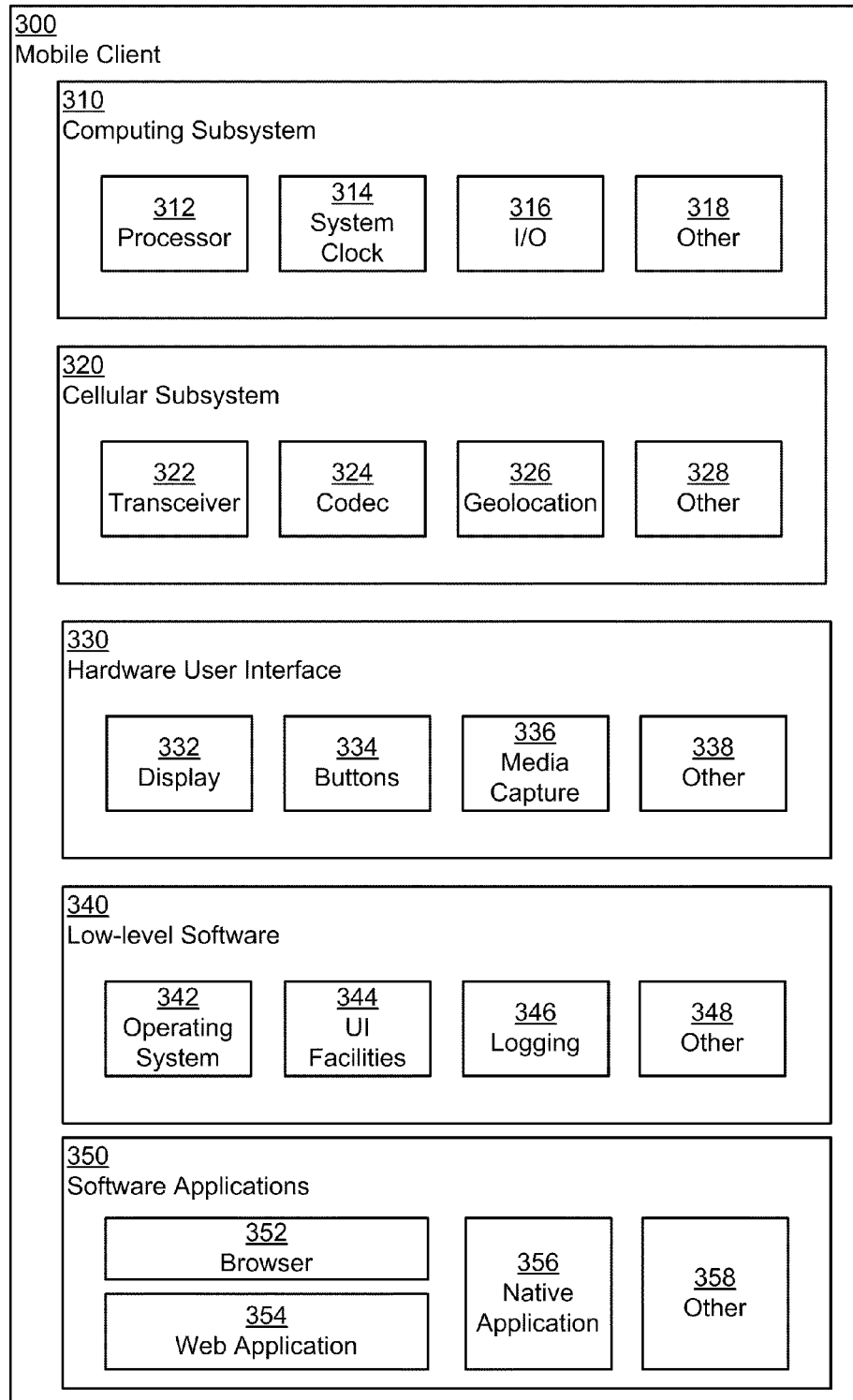
FIG. 3 is an example hardware diagram of a mobile client using an annotation suggestion platform.

FIG. 3 illustrates an exemplary mobile client 300 for an application based on an annotation suggestion platform. While the present disclosure supports other kinds of clients, both web enabled and otherwise, mobile client 300 covers a common scenario of a portable client that is easily accessible and usually present wherever the user goes.

A canonical example of a mobile client is a cell phone. A typical local search enabled mobile client will have cellular communications capability and a media capture device such as a camera. Furthermore, the mobile client will have web browser capability, generally over the cellular communications capability, and the ability to automatically transmit queries over the internet and the ability to display, browse and select received search results. Alternatively, in cases where the annotation application and supporting data are stored locally, on the client, a web connection is not necessary. A mobile client embodiment 300 with web connectivity is a described as follows.

Mobile client 300 comprises a computing subsystem 310, a cellular subsystem 320, a hardware user interface 330, a low-level software layer 340 and various software applications 350.

Computing subsystem 310 includes a processor 312 in the form of a general central processing unit, or alternatively a custom processor. Computing subsystem 310 includes a system clock 314 by which the system may tell time if there is no cellular connectivity. Computing subsystem 310 includes an input/output (I/O) interface 316 for both on-device and extended hardware. Not shown are other computing subsystem components 318 that comprise a hardware platform. These include, but are not limited to, a system bus, RAM, a boot ROM, and a supporting chipset. A power source, such as a battery (not shown), and a recharger (not shown) are also included in computing subsystem 310.

Cellular subsystem 320 includes all hardware necessary to effect cellular communications. Cellular subsystem 320 includes a transceiver 322 to transmit and receive cellular signals. Transceiver 322 may be supported by one or more custom chips implementing cellular radio functionality. Cellular signals may be coded and decoded by codec 324. A geolocation device 326 may be in the form of a global positioning system (GPS) receiver. Alternative geolocation devices may be in the form of a cellular tower triangulation routine. Other components of the cellular subsystem 328 not shown include an antenna and various routines specific to cellular communications such as quality of service and roaming software.

Hardware user interface 330 includes hardware typically directly accessed by users in the operation of mobile client 300. The hardware user interface 300 includes a display, which may be a simple LCD or LED display, or a touch-screen that may or may not support multi-touch. Buttons 334 may include a 9-pad for dialing phone numbers plus a set of auxiliary buttons to navigate through menus and a software user interface as displayed on the display 332. The hardware user interface 330 includes a media capture device 336, including, but not limited to a video camera or a digital still camera that may capture media objects which may be stored locally or uploaded to a web site via the cellular subsystem 320. Other hardware user interface items 338 not shown include, but are not limited to jog dials, power buttons, Wi-Fi™ interfaces, and the like.

Low-level software 340 encompass the operating system 342 and all other system software that comprise a platform for software applications to run upon. Low-level software 340 may include a library of user interface widgets 344 such as text boxes and radio buttons. Low-level software 340 may also include a logging routine 346 to log internet activity locally. It is this logging routine that may track point of interest local searches, and log user selections. The logs may be stored locally, or uploaded to a web site via the cellular subsystem 320. Other low-level software 340 may include intercepts, journaling hooks, device drivers and other kernel level or device level software.

Software applications 350 may be implemented on top of the low-level software 350. One such software application is a web browser 352. Web browser 352 can run web applications 354 over the cellular subsystem 320. One such web application 354 may be an annotation suggestion client. The web browser 352 usually is one of several native applications 356 resident on mobile client 300. In the alternative, an annotation suggestion client application might be implemented as a native application 356 rather than as a web application 354. In either a web or native implementation, an annotation suggestion client may have forms for entering user preferences, for sending a request for suggested annotations for a captured media object, for displaying and selecting suggested annotations, and for selecting, navigating and viewing web pages that relate to the captured media. The operation of these user interface elements are discussed in greater detail with respect to FIG. 5.

Example Client Operation for an Annotation Suggestion Platform

Figure 4:
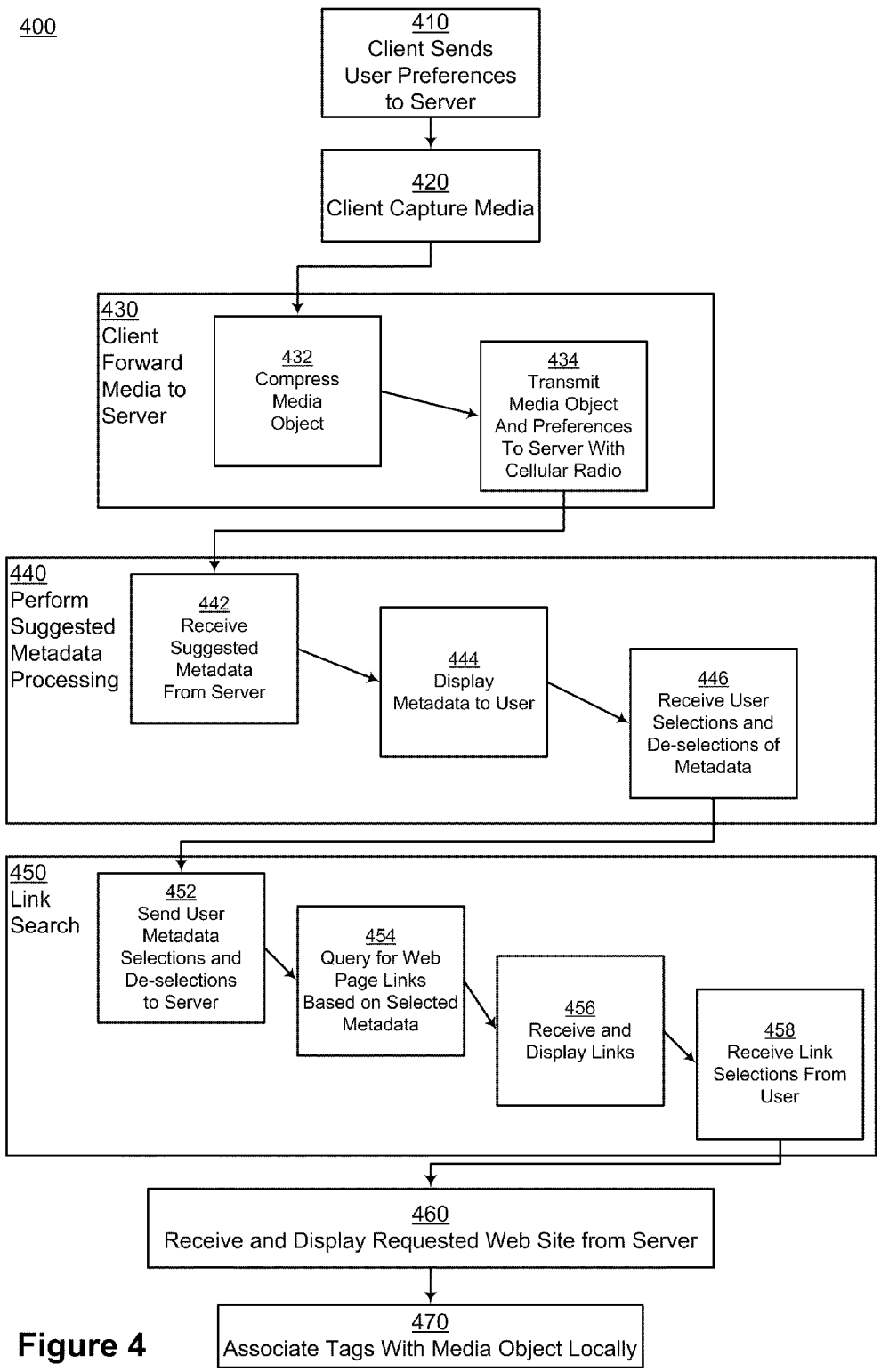
FIG. 4 is a flowchart describing an example embodiment to for a client to request and receive annotation suggestions and web page links from an annotation suggestion platform.
Figure 5:
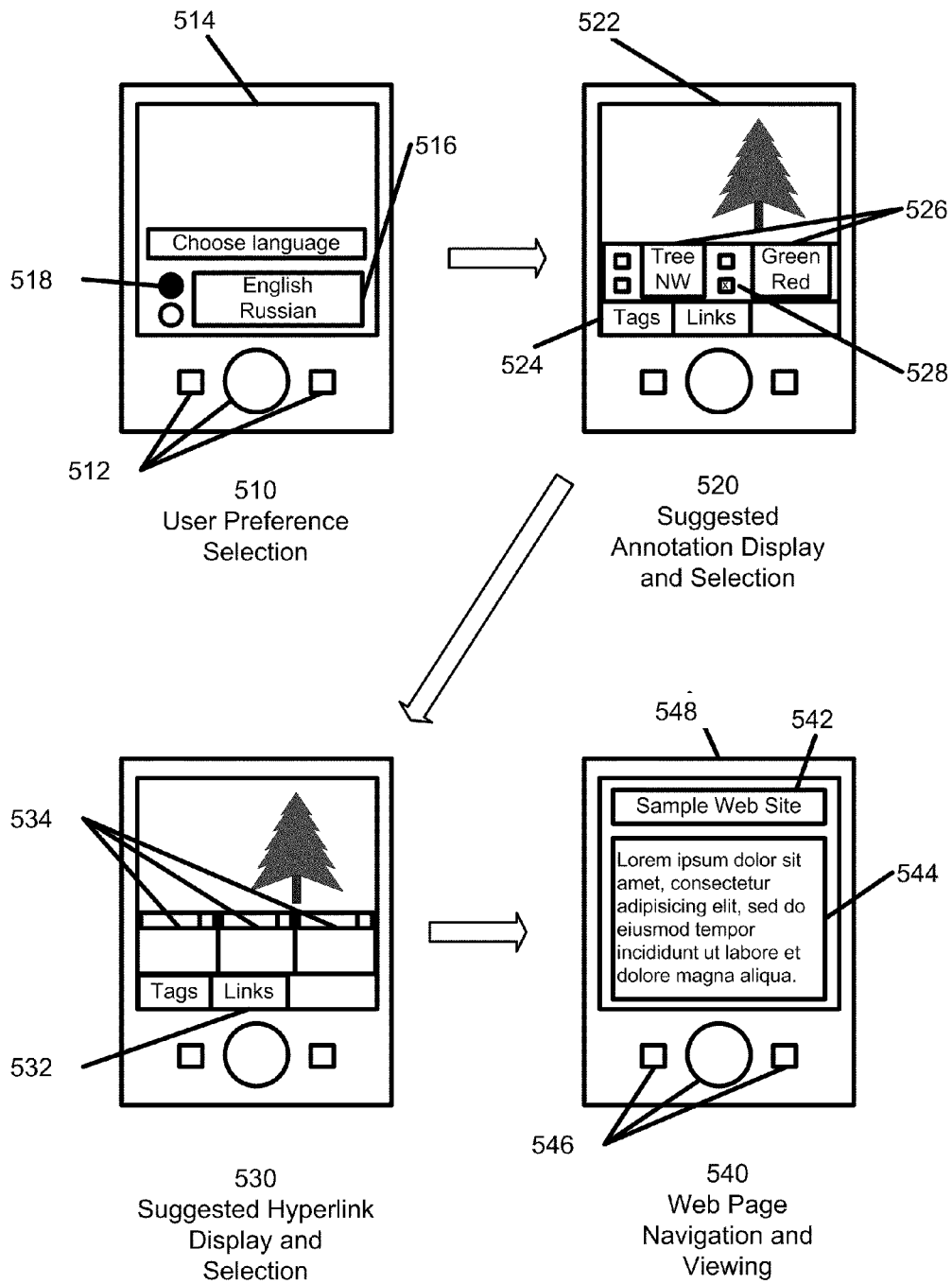
FIG. 5 is an example client user interface for an annotation suggestion platform.

FIG. 4 provides an example flow chart 400 for a client operating against an annotation suggestion platform. FIG. 5 provides an example series of user interfaces 500 that may be used in operation against an annotation suggestion platform.

In FIG. 4, item 410 a user may enter user preferences into the client. User preferences may include user interface configuration information, including, but not limited to, color, theme or skin. User preferences may also include preferences in the operation of the annotation suggestion platform including, but not limited to, suppression of adult content and choice of natural language for suggested tags links and links. Upon entering user preferences, the preferences may be stored local to the client, or alternatively forwarded to the server hosting the annotation suggestion client. User preferences will reside in a location such that the annotation suggestion platform may access them. For example, in embodiments where the client is directly accessing a suggested web site, an adult content filter should be local to the client. By way of another example, in embodiments where the server portion of the annotation suggestion platform generates suggested tags, user preferences for what natural language is to be used for suggested tags should reside on the server.

In FIG. 5, item 510 provides an example user interface to specify a user preference, in this case a natural language choice. In 510, the client includes hardware input buttons 512 and display 514. Display 514 may potentially be a touch screen or multi-touch screen enabling input from the screen and not just hardware buttons 512. Labels 516 indicate a choice of English or Russian natural language preferences for suggested tags and links. Radio buttons 518 allow a user to select a language. Suggested languages 516 and user preferences in general may reside in a previously prepared user profile stored on either the client or the server. An alternative to radio buttons 518 includes, but is not limited to check boxes, which enable multiple languages to be selected. In this way, a user may request suggested tags and links in both English and Russian.

In FIG. 4, item 420, a user captures media with the client. The media may be a video clip, a still image, an audio recording, or some combination of media. In 430, the client forwards the captured media to the server. The forwarding may be at the explicit request of the user, or alternatively, the client may be configured to automatically forward the media immediately upon capture, if web connectivity is available. In some embodiments, if the captured media object is large, in 432 the client may compress the captured media object in order to conserve bandwidth. In other embodiments, where client side processing is limited, compression may not be performed. In 434, the client transmits the captured media object and potentially user preferences to the server that have not yet been forwarded.

In 440, the client receives and displays metadata and receives user feedback on the suggested metadata. Specifically, the client receives suggested metadata from the server side of the annotation suggestion platform determines as related to the captured media. The determination of related metadata is discussed in greater detail with respect to FIGS. 6 and 7. The client then displays the received suggested metadata 444. The user may then select or de-select suggested metadata 446.

In FIG. 5, item 520 is an example user interface to display and select/de-select suggested metadata. In 522, the display shows the captured media; here a still image of a tree. Tabs 524 allow a user to toggle between a view of suggested tags and suggested links. Here, the tag view is active. The user interface 520 displays suggested metadata received from the server. Here, the words, "tree", "NW" (for Northwest, a geographical area known for being heavily forested), "green" and "red" are displayed with labels 526. Check boxes 528 allow a user to select or de-select suggested metadata. Alternative user interface controls including, but not limited to, combo boxes and push buttons may alternatively be used. In user interface 520, the semantics of checking a checkbox 528 is to indicate that the user does not consider the particular suggested metadata to be relevant. Here, "red" has been checked to mean "de-selection" since the user does not consider the word "red" to be relevant metadata for an image of a tree as shown in 522.

Semantics may vary between user interfaces. In other embodiments, checking a checkbox corresponding to metadata may alternatively mean selecting the metadata as relevant.

Returning to FIG. 4, in item 450, the annotation suggestion platform searches for relevant web links based on metadata selected by the client. In one embodiment, the client sends metadata selections and de-selections to the server in order to create and execute web page link searches 452. The server side of the annotation suggestion platform may then execute a query for web page links based on the selected metadata 454. The server side of the annotation suggestion platform may add additional restrictions or otherwise augment the query, including, but not limited to geolocation as determined by Global Positioning Satellite (GPS) or other geolocation detection, date type stamp, and terms based on user preferences. Alternatively, 452 may be executed by the client rather than the server and may directly generate and execute a query for web page links.

Even if the client performs the web page link search, the client may still forward selected and de-selected metadata to the server. In some embodiments, metadata candidates de-selected by users may be aggregated. Where the number of de-selections exceeds a predetermined threshold, the server may identify a de-selected metadata candidate as incorrect metadata, and may start a process to de-associate the metadata candidate from media objects in the data store. In this way, user de-selected metadata may perform a corrective function to the stored media objects.

Regardless if the server or client executes the web page link query, the client will receive and display the web page links 456 satisfying the query. The user may then select a link 458 and navigate to the link via a web browser.

The link search may be triggered by a user command, or may be triggered automatically once a user selects metadata. Alternatively, the link search may be performed in the background or via making use of idle processing time.

In FIG. 5, item 530 is an example user interface for browsing suggested web page links. Specifically, the user selected the "Links" tab 532 to toggle to the web page links view. Thumbnails of relevant web pages 534 appear on the user interface. A user may click on a web page of interest to navigate to that web page. The user interface may allow for scrolling through links. Alternatively, the user interface, may display the links a text interface showing hyperlinks and text descriptions of web sites.

Returning to FIG. 4, once a user makes a web page link selection, the client makes a hypertext transfer protocol (HTTP) request for the web page. When the user receives the web page 460, it displays the web page in a user interface. FIG. 5, item 540 is an example interface of a web site on the client. The client supports a web browser, and displays title bar 542 and content 544. Hardware controls 546 enable scrolling through the web site and activating embedded hyperlinks. Alternatively, if display 548 is a touch screen or multi-touch screen, the user may scroll through the web side and activate embedded hyperlinks directly from display 548.

In FIG. 4, item 470, the selected metadata may then be associated with the captured media. The selected metadata may be stored as metatags or as embedded metadata. Alternatively, the metadata may be transported to the server along with the captured media, stored in a data store. Although, item 470 appears after items 450 and 460, metadata association 470 may be performed at any time after item 446 when the user selects metadata.

Figure 6:
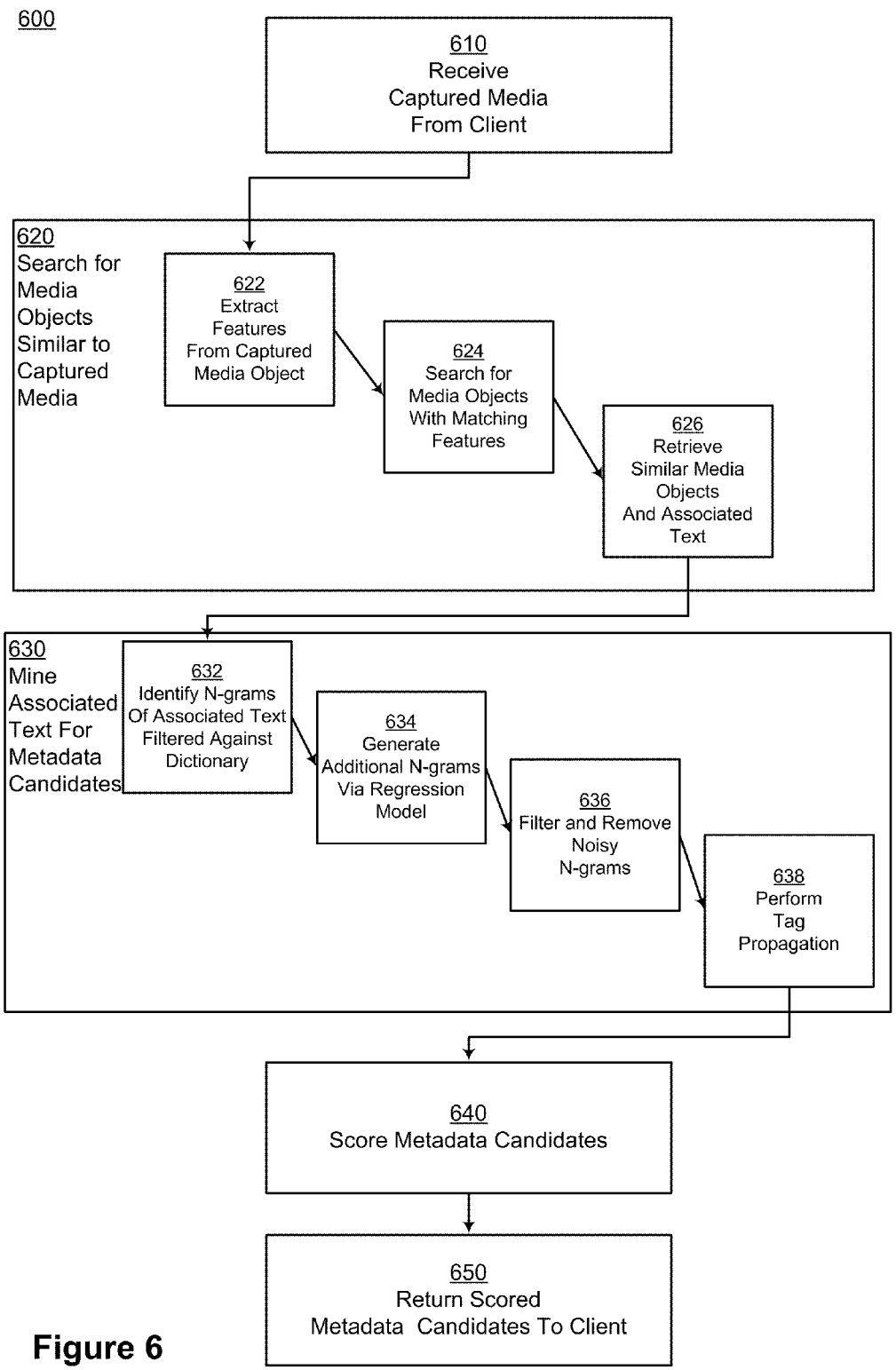
FIG. 6 is a flowchart describing an example embodiment to for a server to respond to client requests for annotation suggestions and web page links for a media object.
Figure 7:
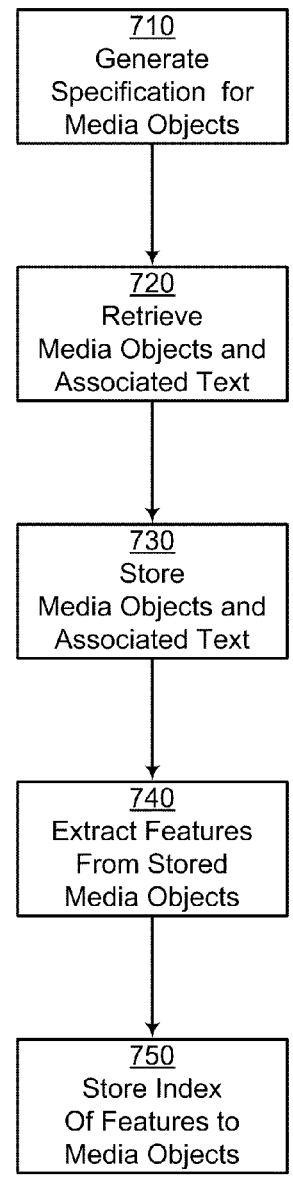
FIG. 7 is a flowchart describing an example embodiment to generate an indexed media object database for an annotation suggestion platform.

Example Server Operation for an Annotation Suggestion Platform

Where FIGS. 3, 4 and 5 describe an example client of an annotation suggestion platform, FIGS. 6 and 7 describe an example server. Specifically, FIG. 6 describes an example server process 600 and FIG. 7 describes an example process to generate an initial database 700.

In FIG. 6, item 610, the server portion of an annotation suggestion platform receives a captured media object from a client, and initiates a search for media objects similar to the captured media 620. The similar media object search may be performed via feature matching. Specifically, features are extracted from the captured media 622. Some features may be local features such as descriptors over interest points such as corners in the media, or recognition of objects in the media. Other features may be global, such as a color histogram of all the colors within the media, or a message digest. Once the features are extracted, the features and corresponding media objects may be searched for 624 within a data store. Once the corresponding media objects are identified, the media objects may be scored, and a predetermined number of matching media objects may be retrieved along with text associated with the media objects. Degree of similarity may be determined via a similarity score, or alternatively via a quality filter such as a filter for redundant, near-duplicate images. As yet another alternative, where near-duplicates are identified, text associated with a large number of near-duplicates may be weighed more than text associated with images with a lesser number of near-duplicates.

Once media objects similar to a captured object are identified, the associated text may be mined for metadata candidate 630. Associated text may come in many forms including, but not limited to, metatags, embedded tags, overloaded filenames and stored links to associated text. Some text may be unprocessed text. For example, text surrounding an image in a web page may be bodily extracted. Alternatively annotations and commentary from a user feedback web page may be retrieved. In both cases, the metadata will be separated from the raw extracted text.

In one embodiment, in item 632, the associated text is scanned for n-grams 632. Specifically, an n-gram is a word vector or term vector containing n items. An n-gram might require a semantic relation on the position within a vector. For example, a 3-gram may require a subject-verb-object relationship with a subject in position 1, a verb in position 2 and an object in position 3. Other n-grams may not require a semantic relation. Once the scan identifies n-grams, the n-grams may be filtered against a vocabulary or a dictionary of n-grams. Candidate n-grams not found in the vocabulary or dictionary are eliminated as false positives.

It is possible that after filtering, a relatively small number of n-grams will remain. In this event, the server side of an annotation suggestion platform may attempt to extrapolate additional n-grams, perhaps through a regression model 634. Specifically, n-grams not explicitly retrieved from candidate metadata but similar to n-grams surviving the initial filter in 632 may be generated from other sources including, but not limited to ontologies, synonym dictionaries or foreign language dictionaries. Similar n-grams may be identified via a regression model or via applying similarity metrics. Generated n-grams may then be filtered and statistically noisy n-grams removed 636. Other alternatives for extrapolating n-grams include, but are not limited to majority voting, machine learning methods, and data mining methods.

Tag propagation 638 also provides an alternative technique to provide additional n-grams. Tag propagation is discussed with respect to FIGS. 8 and 9 below.

Once a final list of n-grams comprising suggested metadata candidates has been mined in 630, the metadata candidates are scored for relevance by any number of relevancy scores in 640. The metadata candidates may be ranked and returned to the client 650 for potential association with a captured media object. Alternatively, not all the scored metadata candidates will be forwarded to the client. Rather, a predetermined number of highest ranked metadata candidates might be forwarded instead.

Generating an Initial Database

In FIG. 6, item 620 describes an embodiment where media objects similar to a captured media object are identified via matching features. FIG. 7 describes an example process 700 to generate an initial database to support feature matching. Specifically, FIG. 7 describes a technique 700 to retrieve media objects, identify features in the retrieved media objects, store the features and objects and store an index to identify objects via features. The index improves performance of the annotation suggestion platform such that a user may be receive annotation suggestions substantively in real-time in an interactive online session. Specifically the annotation suggestions are received in the same session that a captured media object is sent.

In item 710, an administrator, or automated process generates a specification for media objects. The specification may be an Internet search query for media objects. Alternatively, the specification could merely be the location, such as a file directory, of a previously prepared set of media objects.

In item 720, the media objects are retrieved along with their text associated with the media objects. The text may be explicitly stored with the media objects including, but not limited to, overloaded filenames, metatags and embedded tags. Alternatively, the media objects may have associated text stored separately including, but not limited to, surrounding text, annotation and commentary.

In item 730, the media objects and associated text, or alternatively references to the media objects and associated text are stored in a data store. Where the media objects and associated text are stored, less processing is necessary. In some embodiments, the associated text may be pre-mined for metadata candidates, reducing the processing needed to perform mining in later stages. However, media objects may require a large amount of storage. Accordingly, an alternative embodiment may be to store web hyperlinks to the locations of media objects, and to retrieve the media objects and surrounding text dynamically on-demand. In this embodiment, more processing, but less storage space is required.

In item 740, features are extracted from stored media objects, using technique similar to those described with respect to item 622, but requiring less storage space. When a feature is extracted from a media object, a cross reference record, or other indexing record mapping a feature identifier and a media object may be stored 750.

If a relational database is used to store media objects, features, and associated text, then a cross-reference table mapping features to media objects may be created. Alternatively, an inverted index may be built that maps features to media objects. Specifically, when local features are extracted, each visual word is used as a key that is used to connect to media objects that contain the visual word. In other embodiments, a lookup table storing pointers to features and media objects may be used. The lookup table may be implemented in various ways including, but not limited to a hierarchy, hash table or a tree structure. Each record may comprise a key-value pair of a feature identifier and a media object identifier or their pointers. The feature identifier or pointer may then used as a key.

Regardless of embodiment, when a feature is extracted from a candidate media object, its feature identifier may be used to identify other media objects cross referenced against the same identifier. Where all or a majority of features in a captured media object are shared with another media object, those two media objects may be deemed to be similar. Since the media object has been stored with its associated text, the associated text of similar media objects may then be retrieved for candidate metadata mining.

Tag Propagation

For still image media objects, metadata is typically associated with the entire object. However, for video media objects, which comprise multiple frames, it is not always the case that metadata is associated with the entire object. A video may comprise multiple scenes, each of which has a different set of metadata requirements. For example, a first scene may show a car, and the scene's frames may be associated with the word "car" as metadata. But if the second scene is that of a house, the "car" metadata of the first scene may be inappropriate for frames from the second scene.

Even if the frames are in the same scene, it may not be the case that all the frames are associated with the same metadata.

Figure 8:
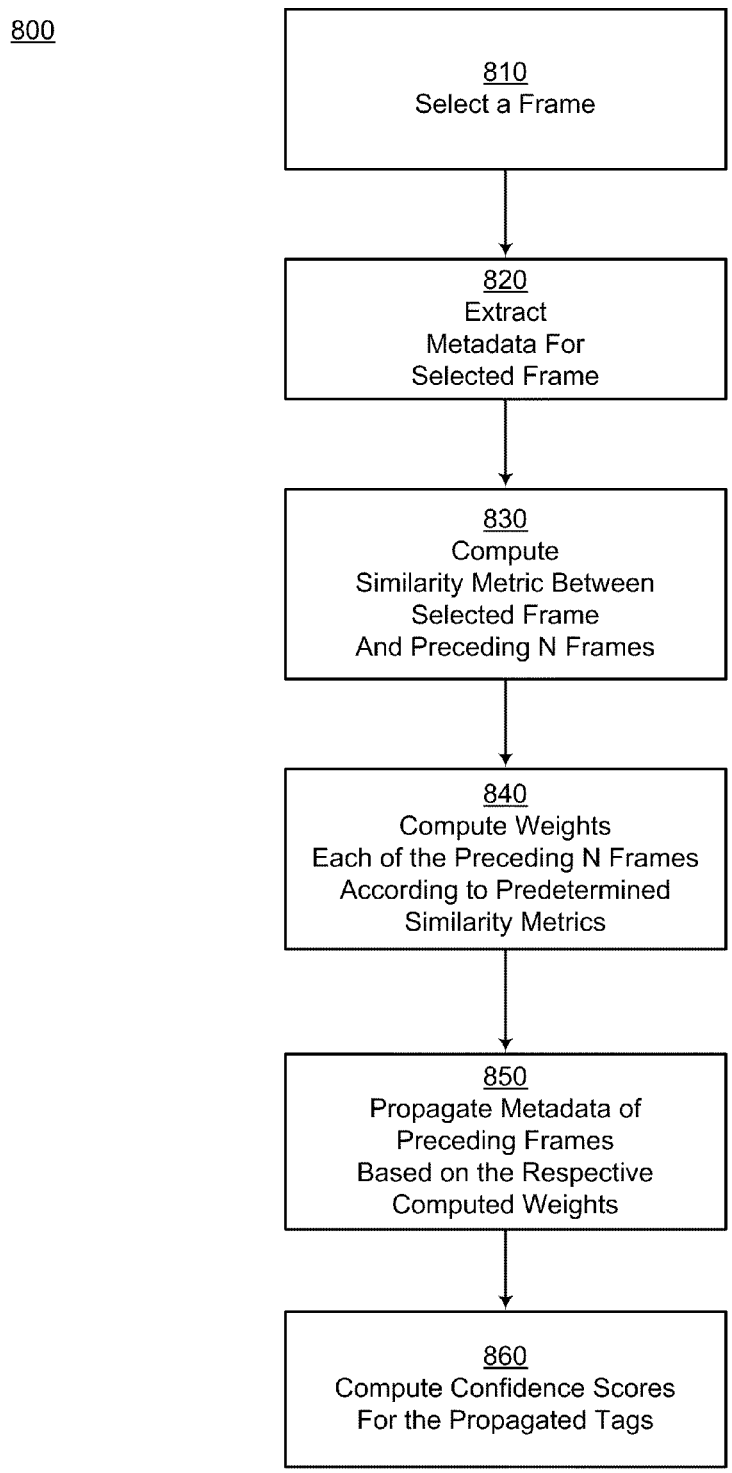
FIG. 8 is a flow chart describing an example embodiment for tag propagation.
Figure 9:
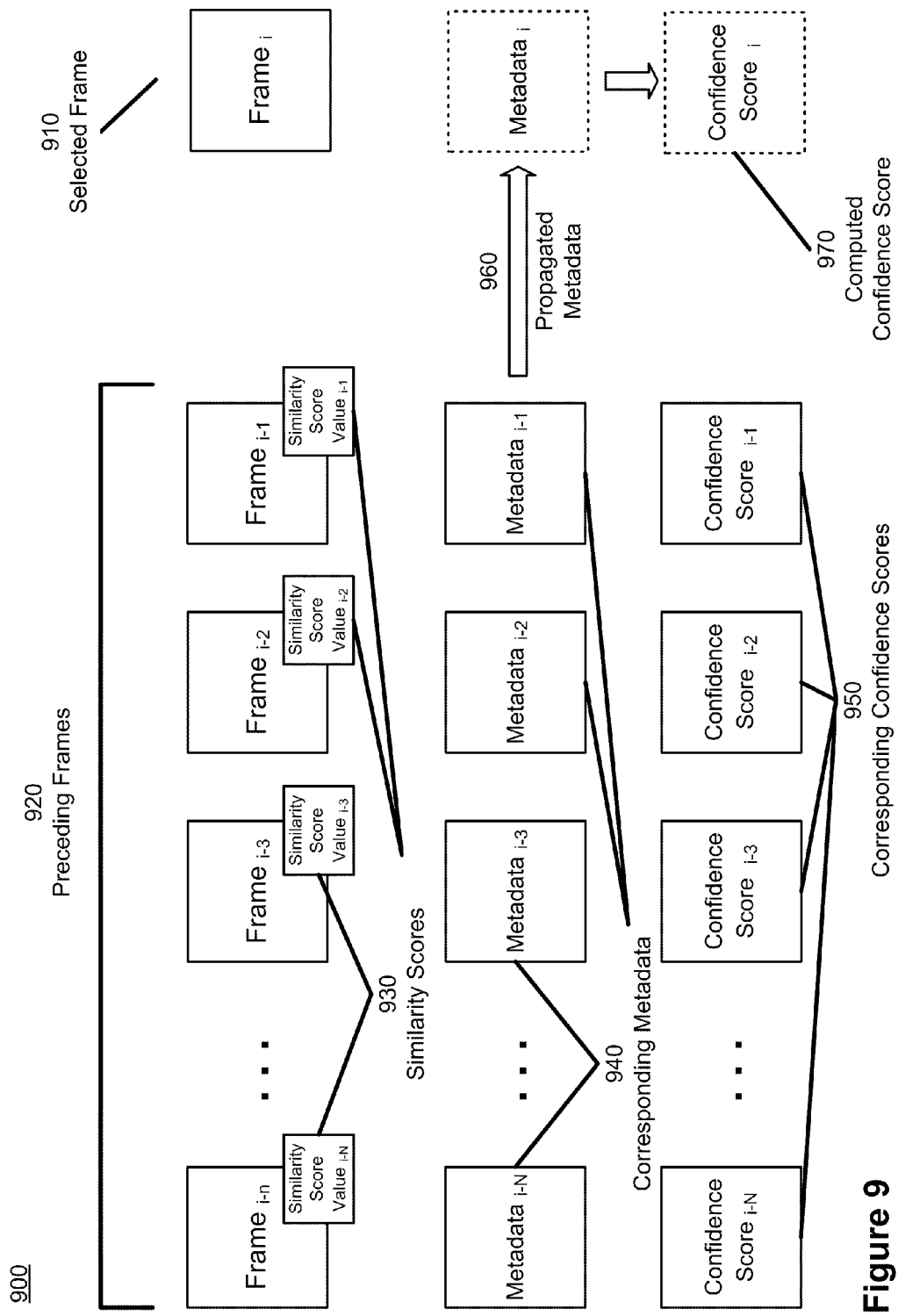
FIG. 9 is a diagram illustrating the example data processing during tag propagation in a video object.

Tag propagation is a technique where a selected frame in a video object is associated with metadata from preceding frames, based on the degree of similarity of the selected frame and the preceding frames. If the preceding frame is similar to the selected frame, then the preceding frame's metadata is propagated to the selected frame. Otherwise, the preceding frame is deemed to be dissimilar, and the metadata is not propagated. FIGS. 8 and 9 provide a flow chart 800 and a diagram 900 to illustrate tag propagation.

In FIG. 8, item 810 is a frame is selected for tag propagation. The frame may be selected via a user, but more commonly is selected via an automated process. In one embodiment, a tag propagation application serially walks the frames comprising a video from the beginning of the video to the end. It determines whether a frame has less metadata than a predetermined threshold and accordingly starts the tag propagation process. In FIG. 9, selected frame is depicted as block 910 and labeled Frame$_i$.

In FIG. 8, item 820, any metadata already associated with selected frame 910 is extracted. The extracted metadata may be stored later in the process, or may be used to determine whether other frames are similar to the selected frame 910. In FIG. 9, the metadata of selected frame 910 is denoted Metadata$_i$.

In FIG. 8, item 830, a predetermined number of frames N that precede selected frame 910 are identified. These preceding frames are illustrated in FIG. 9 as items 920 and denoted Frame$_{i-1}$ through Frame$_{i-N}$. A similarity metric between the selected frame 910 and preceding frames 920 is calculated resulting in corresponding similarity score values 930 Value$_{i-1}$ through Value$_{i-N}$.

In some embodiments, preceding frames 920 are stored in an active buffer, in RAM or other working memory of an application. The preceding frames may also be stored allowing with metadata 940 corresponding to the frames 940, and confidence scores 950 indicating the degree of relevance of metadata 940 to the preceding frames 920. There may be separate confidence scores 950 for each item of metadata 940, or alternatively, there may be a single confidence score 950 that applies to all the metadata 940 for a preceding frame 920.

In FIG. 8, item 840, weights are computed for each of the preceding frames 920 based on the similarity scores 930. These weights will be used to determine the likelihood that metadata from a preceding frame 920 should be propagated to the selected frame 910. Metadata corresponding to the frames is shown in FIG. 9 as items 940 and denoted Metadata$_{i-1}$ through Metadata$_{i-N}$. Metadata for Frame$_i$ is denoted Metadata$_i$.

For example, the distance of a frame to the selected frame may be used to determine the likelihood that the two frames are sufficiently similar to propagate tags. If a preceding frame 920 is within two frames of the selected frame, then it is highly likely that the two frames are similar, and that metadata should be propagated from the frame to the selected frame. However, if a preceding frame 920 is five hundred frames from selected frame 910, it is highly likely that the frames are dissimilar enough to suppress metadata propagation to the selected frame 910. In this case, the frames may be in completely different scenes. Other predetermined similarity measures, including analysis of extracted features may used instead. Alternatively, an amalgam of similarity measures may be used, for instance having a similarity metric measure scored directly in proportion to the preceding frame's 920 respective distance to the selected frame 910.

In FIG. 9, confidence scores corresponding to the preceding frames 920 are depicted as item 950. and denoted $Score_{i-1}$ through $Score_{i-N}$. Confidence scores for $Frame_i$ is denoted $Score_i$. Confidence scores 950 provide a measure of the likelihood that the metadata associated with a frame is correct. In some embodiments, confidence scores 950 are used as input to determine whether metadata from a preceding frame 920 should be propagated to a selected frame 910.

In FIG. 8, item 850, the computed weights, based on the similarity measures 930, and optionally on confidence scores 950 are used to determine whether metadata 930 from a preceding frame 920 is to be propagated to the metadata of the selected frame 910. In FIG. 9, this propagation is depicted as arrow 960. For example, where a similarity score 930 for a preceding frame 920, weighted by the preceding frame's 920 distance from the selected frame 910, is within a predetermined threshold, all the corresponding metadata 940 for the frame may be propagated to the selected frame 910. Alternatively, in an embodiment where each metadata item 930 corresponding to a previous frame 920 has its own confidence score 950, individual items may be selectively propagated based on whether a final score taking the confidence score 950 into account is within a predetermined threshold. In yet another embodiment, a preceding frame 920 may have a single confidence score 950 uniformly applying to all corresponding metadata 940.

In FIG. 8, item 860, for embodiments incorporating confidence scores, a confidence score for the metadata propagated to selected frame 910 is calculated and stored. This confidence score for the selected frame 910 is depicted in FIG. 9 as block 970.

CONCLUSION

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

We claim:

1. A method comprising:
identifying, by a computing device, candidate n-grams from metadata associated with a plurality of media objects, the candidate n-grams comprising metadata candidates for annotating a captured media object;
searching for the candidate n-grams in a dictionary;
discarding one or more of the candidate n-grams that are not found in the dictionary;
calculating confidence scores for remaining candidate n-grams following the discarding;
returning one or more of the remaining candidate n-grams as annotation suggestions for a captured media object, each of the one or more of the remaining candidate n-grams having a confidence score that satisfies a predetermined confidence criterion; and
providing, by the computing device, the annotation suggestions to a client device to enable a user selection of at least one of the annotation suggestions as an annotation of the captured media object.

2. The method of claim 1, further comprising:
extracting features from the captured media object;
searching for the features against a previously prepared index of mapping features to the plurality of media objects; and
retrieving the plurality of media objects from a group of media objects in response to determining that the plurality of media objects have features mapped in the previously prepared index that are similar to the features extracted from the captured media object.

3. The method of claim 1, wherein the identifying includes:
determining whether a number of candidate n-grams is less than a predetermined threshold;
generating a new n-gram in response to determining that the number of the candidate n-grams is less than the predetermined threshold, the generating of the new n-gram being performed via one of a machine learning algorithm or a data mining algorithm;
applying a noise filter to the new n-gram;
discarding the new n-gram in response to determining that the new n-gram does not satisfy a noise criteria; and
storing the new n-gram as one of the candidate n-grams in response to determining that the new n-gram satisfies the noise criteria.

4. The method of claim 1, wherein the captured media object is a video object comprising one or more frames, further comprising performing tag propagation, the tag propagation including:
extracting a metadata set for a selected frame in the video object;
selecting a predetermined number of preceding frames in the video object;
retrieving a corresponding metadata set for each of the preceding frames from a buffer;
computing a corresponding similarity score for each of the preceding frames with respect to the selected frame;
propagating at least a portion of metadata in the corresponding metadata set of each preceding frame with the corresponding similarity score that is within a predetermined threshold to the metadata set of the selected frame; and
storing in the buffer the metadata set of the selected frame.

5. The method of claim 4, the method further comprising:
computing a first input score for a preceding frame based on a first similarity metric; and
computing a second input score for the preceding frame based on a second similarity metric,
wherein the similarity score for the preceding frame is computed from at least the first and second input scores.

6. The method of claim 4, wherein each similarity score is weighted by a distance of a corresponding preceding frame to the selected frame.

7. The method of claim 6, the method further comprising:
computing a confidence score for the selected frame based on stored metadata set of the selected frame; and
storing the confidence score for the selected frame to enable tag propagation for subsequent frames.

8. The method of claim 1, wherein the annotation suggestions include a hyperlink to a web page.

9. A method to propagate metadata within video objects, the method comprising:
extracting a metadata set for a selected frame in a video object;
selecting a predetermined number of preceding frames in the video object;
retrieving a metadata set for each of the preceding frames from a buffer;

computing a respective similarity score for each of the preceding frames with respect to the selected frame;

computing a respective confidence score for each metadata set belonging to the preceding frames;

computing a corresponding final score for each preceding frame based on a corresponding similarity score and a corresponding confidence score;

propagating at least a portion of metadata in a corresponding metadata set of each preceding frame with the corresponding final score that is within a predetermined threshold to the metadata set of the selected frame; and storing in the buffer the metadata set of the selected frame.

10. The method of claim 9, the method further comprising:

computing a first input score for a preceding frame based on a first similarity metric; and computing a second input score for the preceding frame based on a second similarity metric, wherein the similarity score is computed from at least the first and second input scores.

11. The method of claim 9, wherein a confidence score indicates a degree of relevance of the corresponding metadata set to a corresponding preceding frame.

12. The method of claim 11, wherein each similarity score is weighted by a distance of a corresponding preceding frame to the selected frame.

13. The method of claim 9, wherein the metadata set of the selected frame include at least one of a text description or a hyperlink to a web page.

14. A system comprising:

a processor; and a computer readable memory containing computer executable-instructions, the computer-executable instructions configured to be executed by the processor to perform operations including:

extracting a metadata set for a selected frame in a video object;

selecting a predetermined number of preceding frames in the video object;

retrieving a metadata set for each of the preceding frames from a buffer;

computing a corresponding confidence score for each metadata set belonging to the preceding frames;

computing a corresponding similarity score for each of the preceding frames with respect to the selected frame;

computing a corresponding final score for each of the preceding frames based on a corresponding similarity score and a corresponding confidence score;

propagating at least a portion of metadata in a corresponding metadata set of each preceding frame with the corresponding final score that is within a predetermined threshold to the metadata set of the selected frame; and storing in the buffer the metadata set of the selected frame.

15. The system of claim 14, wherein the computing a corresponding similarity score for a preceding frame comprises:

computing a first input score for the preceding frame based on a first similarity metric;

computing a second input score for the preceding frame based on a second similarity metric; and computing the corresponding similarity score from at least the first and second input scores.

16. The system of claim 14, wherein each similarity score is weighted by a distance of a corresponding preceding frame to the selected frame.

17. The system of claim 14, wherein a confidence score indicates a degree of relevance of the corresponding metadata set to a corresponding preceding frame.

18. The system of claim 14, wherein the metadata set of the selected frame include at least one of a text description or a hyperlink to a web page.

* * * * *